United States Patent
Chen et al.

(10) Patent No.: US 9,191,165 B2
(45) Date of Patent: Nov. 17, 2015

(54) BASE STATION, USER DEVICE, COMMUNICATION SYSTEM, METHOD FOR CONTROLLING BASE STATION, METHOD FOR CONTROLLING USER DEVICE, METHOD FOR CONTROLLING COMMUNICATION SYSTEM, PROGRAM, AND STORAGE MEDIUM

(75) Inventors: Chen Chen, Shanghai (CN); Renmao Liu, Shanghai (CN); Ming Ding, Shanghai (CN); Lei Huang, Shanghai (CN); Guolin Sun, Shanghai (CN)

(73) Assignee: SHARP KABUSHIKI KAISHA, Osaka (JP)

( * ) Notice: Subject to any disclaimer, the term of this patent is extended or adjusted under 35 U.S.C. 154(b) by 1020 days.

(21) Appl. No.: 13/058,156
(22) PCT Filed: Aug. 11, 2009
(86) PCT No.: PCT/JP2009/064187
§ 371 (c)(1),
(2), (4) Date: Feb. 8, 2011
(87) PCT Pub. No.: WO2010/018826
PCT Pub. Date: Feb. 18, 2010

(65) Prior Publication Data
US 2011/0136495 A1    Jun. 9, 2011

(30) Foreign Application Priority Data

Aug. 11, 2008 (CN) .......................... 2008 1 0129720

(51) Int. Cl.
*H04W 72/00* (2009.01)
*H04L 5/00* (2006.01)
*H04W 72/04* (2009.01)

(52) U.S. Cl.
CPC .............. *H04L 5/001* (2013.01); *H04L 5/0037* (2013.01); *H04L 5/0053* (2013.01); *H04L 5/0055* (2013.01); *H04L 5/0057* (2013.01); *H04W 72/0453* (2013.01); *H04W 72/0413* (2013.01)

(58) Field of Classification Search
CPC ..... H04W 72/04; H04W 76/02; H04W 16/10; H04W 28/16; H04W 16/14; H04W 72/042; H04W 72/0453; H04W 72/085; H04W 28/08; H04W 28/12; H04W 72/0486; H04W 72/08; H04W 72/12; H04W 72/1226; H04W 72/02; H04W 72/0413; H04W 72/1284; H04W 28/0236; H04W 52/241; H04W 52/244; H04W 74/006; H04W 52/146; H04W 72/00; H04L 5/0073; H04L 5/0048; H04L 5/0053; H04L 65/80; H04L 43/0811; H04L 5/0046; H04B 1/667; H04B 7/0452; H04B 7/0619; H04B 7/0626; H04B 7/0632; H04B 7/0691; H04B 7/066; H04J 3/1694
USPC ......... 455/450, 509, 511, 513, 500, 508, 515, 455/422.1, 451, 452.1, 426.1, 426.2; 370/328, 329, 330, 310
See application file for complete search history.

(56) References Cited

U.S. PATENT DOCUMENTS 7,764,931 B2 *  7/2010  Kim et al. ........................ 455/69
8,442,568 B2 *  5/2013  Chen et al. .................... 455/509

(Continued)

FOREIGN PATENT DOCUMENTS

CN    101238672 A    8/2008
EP    1 879 422 A2   1/2008

(Continued)

OTHER PUBLICATIONS

3GPP TSG RAN WG1 Meeting #53bis, Warsaw, Poland, Jun. 30-Jul. 4, 2008, "Proposals for LTE-Advanced Technologies," NTT DoCoMo, Inc., R1-082575.

(Continued)

*Primary Examiner* — Nimesh Patel
(74) *Attorney, Agent, or Firm* — Birch, Stewart, Kolasch & Birch, LLP

(57) ABSTRACT

In a mobile communication system of the present invention, a base station apparatus and mobile station apparatus (user device) communicate each other on a plurality of downlink component carriers and a plurality of uplink component carriers. And while the mobile station apparatus (user device) transmit an uplink data to the base station apparatus on the plurality of uplink component carriers, the mobile station apparatus (user device) transmit a scheduling request for requesting uplink resource for the uplink data to the base station apparatus using a physical uplink control channel (PUCCH) only on a specific uplink component carrier of the plurality of uplink component carriers.

5 Claims, 10 Drawing Sheets

(56) References Cited

U.S. PATENT DOCUMENTS

| | | | |
|---|---|---|---|
| 2002/0159410 | A1 | 10/2002 | Odenwalder et al. |
| 2006/0013156 | A1 | 1/2006 | Miyoshi et al. |
| 2006/0268983 | A1 | 11/2006 | Kwon et al. |
| 2007/0086367 | A1 | 4/2007 | Sung et al. |
| 2007/0098098 | A1 | 5/2007 | Xiao et al. |
| 2007/0115796 | A1 | 5/2007 | Jeong et al. |
| 2007/0230397 | A1* | 10/2007 | Sakata ............ 370/329 |
| 2008/0031179 | A1 | 2/2008 | Gao et al. |
| 2008/0316959 | A1* | 12/2008 | Bachl et al. ......... 370/329 |
| 2009/0028260 | A1 | 1/2009 | Xiao et al. |

FOREIGN PATENT DOCUMENTS

| | | |
|---|---|---|
| JP | 2007-68180 A | 3/2007 |
| JP | 2009-514359 A | 4/2009 |
| WO | WO 98/37706 A2 | 8/1998 |
| WO | WO 2006/118434 A1 | 11/2006 |
| WO | WO 2007/053403 A2 | 5/2007 |
| WO | WO 2007/109917 A1 | 10/2007 |

OTHER PUBLICATIONS

3GPP TR 36.913 V8.0.0 (Jun. 2008), 3rd Generation Partnership Project; Technical Specification Group Radio Access Network; Requirements for Further Advancements for E-UTRA (LTE-Advanced),• (Release 8).

3GPP TS 36.211 V8.3.0 (May 2008), 3rd Generation Partnership Project; Technical Specification Group Radio Access Network; Evolved Universal Terrestrial Radio Access (E-UTRA); Physical Channels and Modulation; (Release 8).

3GPP TS 36.213 V8.3.0 (May 2008); 3rd Generation Partnership Project; Technical Specification Group Radio Access Network; Evolved Universal Terrestrial Radio Access (E-UTRA); Physical layer procedures; (Release 8).

Ericsson, "Carrier aggregation in LTE-Advanced", TSG-RAN WG1 #53bis, R1-082468, Warsaw, Poland, Jun. 30-Jul. 4, 2008.

NTT DoCoMo, Inc., "Proposals for LTE-Advanced Technologies", 3GPP TSG RAN WG1 Meeting #53, R1:081948, Kansas City, USA, May 5-9, 2008.

Panasonic, NEC Group, "Correction of subscripts in TS 36.213 section 7.2.2", 3GPP TSG-RAN WG1 Meeting #53bis, R1-082418, Warsaw, Poland, Jun. 30-Jul. 4, 2008.

3GPP, 3rd Generation Partnership Project; Technical Specification Group Radio Access Network; Evolved Universal Terrestrial Radio Access (E-UTRA); Physical layer procedures (Release 8), 3GPP TS 36.213 V8.8.0, Sep. 2009, 78 pages.

3GPP, 3GPP TS 36.213 V8.2.0 (Mar. 2008), "3rd Generation Partnership Project; Technical Specification Group Radio Access Network; Evolved Universal Terrestrial Radio Access (E-UTRA); Physical layer procedures (Release 8)," Mar. 2008, 30 pages.

International Preliminary Report of Patentability (PCT/IPEA/409) dated Apr. 9, 2010 for International Application No. PCT/JP2009/058206 with English translation.

International Search Report (PCT/ISA/210) dated May 26, 2009 for International Application No. PCT/JP2009/058206,.

Motorola, "Set S for CQI Feedback", 3GPP TSG RAN1#52bis, R1-081312, Shenzhen, China, Mar. 31-Apr. 4, 2008, 1 page.

Motorola, "Update of TS36.213 according to changes listed in cover sheet," 3GPP TSG-RAN WG1 Meeting #52, R1-081158, Sorrento, Italy, Feb. 11-15, 2008, pp. 1-27.

NEC Group, "A Proposal for Set S", TSG-RAN WG1 #52 bis, R1-081564, Shenzhen, China, Mar. 31-Apr. 4, 2008, 2 pages.

Panasonic, "Effect of set S on CQI reports", 3GPP TSG-RAN WG1 Meeting #52bis, R1-081202, Shenzhen, China, Mar. 31-Apr. 4, 2008, pp. 1-3.

Sharp, "Considerations on Set S", 3GPP TSG-RAN WG1#53, R1-081763, Kansas City, Missouri, USA, May 5-9, 2008, pp. 1-2.

U.S. Notice of Allowance dated Mar. 19, 2013 for U.S. Appl. No. 12/989,030.

U.S. Office Action dated Jan. 11, 2013 for U.S. Appl. No. 12/989,030.

European Search Report issued in European Application No. 09806717.6 on Jun. 6, 2014.

* cited by examiner

BASE STATION, USER DEVICE, COMMUNICATION SYSTEM, METHOD FOR CONTROLLING BASE STATION, METHOD FOR CONTROLLING USER DEVICE, METHOD FOR CONTROLLING COMMUNICATION SYSTEM, PROGRAM, AND STORAGE MEDIUM

TECHNICAL FIELD

The present invention relates to a technical field of wireless communication, particularly, a base station, a user device, a communication system, a method for controlling a base station, a method for controlling a user device, a method for controlling a communication system, a program, and a storage medium, each of which is LTE (Long-Term Evolution)-Advanced compatible.

BACKGROUND ART

In recent years, a personal communication device has been miniaturized and diversified significantly with a field of personal communication rapidly developed. Various data services, such as multimedia information, online gaming, video-on-demand, music download, and mobile TV, have been provided and personal demand for communication and entertainment seems to be substantially satisfied with them. Under the circumstances, a main problem of a next-generation mobile communication system would be how to provide a user with a higher peak velocity and a wider system frequency band.

At the 53rd meeting of 3GPP RAN1, held in Kansas City in the U.S. on May 5-9, 2008, by 3GPP (the 3rd Generation Partner Project) which is an international organization for standardization, requirements for LTE-Advanced and possible propositions related to the LTE-Advanced were discussed. After the meeting, "TR36.913v8.0.0, Requirements for Further Advancements for E-UTRA (LTE-Advanced)" was submitted and adopted, in which it is clearly stated that the LTE-Advanced system having a maximum system frequency band of 100 MHz should be supported. In addition, a great number of companies proposed, at the meeting, that an uplink system bandwidth narrower than a downlink system bandwidth should be supported (see Non Patent Literature 1, for example).

This proposition, however, gives rise to a problem that the uplink system bandwidth and the downlink system bandwidth of the LTE-Advanced system would be different in size from each other. As to a conventional LTE system, the uplink system bandwidth and the downlink system bandwidth are equal in size to each other, and the maximum system bandwidth is 20 MHz. The conventional LTE system has thus allowed its LTE base station to accurately acquire, from an LTE user device (mobile station terminal), uplink control signaling in a downlink bandwidth occupied by the LTE user device (i.e. downlink control signaling related to uplink control information, also called "DCI (Downlink Control Information) format 0"). In contrast, the LTE-Advanced system employs the uplink system bandwidth and the downlink system bandwidth which are asymmetric to each other. Thus, it has been required a novel method for feeding back the uplink control signaling to the base station.

Further, one of the above requirements for the LTE-Advanced is compatibility between the LTE-Advanced system and a conventional LTE user device, that is, operation of LTE and LTE-Advanced should be possible in the same frequency spectrum.

CITATION LIST

Non Patent Literature 1

R1-082468 "Carrier aggregation in LTE-Advanced," Ericsson, 3GPP TSG RAN1 #53bis meeting, Jun. 30-Jul. 4, 2008; R1-081948 "Proposals for LTE-Advanced Technologies", NTT Docomo, 3GPP TSG RAN1 #53rd, May 5-9, 2008

SUMMARY OF INVENTION

Technical Problem

For the reasons described above, there has been demand for a method for feeding back the uplink control signaling to the base station effectively and easily under the condition where the uplink system bandwidth and the downlink system bandwidth of the LTE-Advanced system are asymmetric to each other. It has been also demanded that such a method should allow application of the existing mechanisms related to the conventional LTE system to the LTE-Advanced system, as much as possible, so as to (i) ensure compatibility between the LTE system and the LTE Advanced system and (ii) support a smooth change from the LTE system to the LTE-Advanced system.

Solution to Problem

In order to attain the object, a base station of the present invention, for use in a communication system in which the base station and a user device are wirelessly communicable with each other when the user device is in a cell of the base station, includes: sending/receiving means for sending/receiving signaling and data to/from the user device in the cell of the base station; resource allocation means for (i) dividing a downlink system bandwidth of the communication system into a plurality of downlink basic bandwidths (also called "component carriers") and (ii) carrying out allocation of resource blocks of PUCCH (Physical Uplink Control Channel); sequence allocation means for allocating a sequence(s) to downlink basic bandwidth(s) allocated to the user device among the plurality of downlink basic bandwidths, on the basis of the number of the downlink basic bandwidths allocated to the user device, so that uplink control signaling information in each of the downlink basic bandwidth(s) allocated to the user device is fed back to the base station; and resource scheduling transmission optimizing means for (i) obtaining the uplink control signaling information corresponding to each of the downlink basic bandwidth(s) allocated to the user device, on the basis of setting of the sequence(s) allocated by the sequence allocation means and (ii) optimizing downlink resource scheduling and downlink transmission on the basis of the uplink control signaling information thus obtained.

Note that the feedback information is SR (Scheduling Request), ACK (Acknowledgement)/NACK (Negative Acknowledgement), CQI (Channel Quality Indicator), or any combination thereof.

According to the arrangement, the base station carries out allocation of the sequences on the basis of the number of downlink basic bandwidths allocated to the user device, so that the uplink control signaling in each of the downlink basic bandwidth(s) allocated to the user device is fed back to the base station. Each of the sequences is mapped on a corresponding piece of an uplink resource.

This makes it possible to feedback the uplink control signaling information easily and highly efficiently, while using a feedback mechanism of a conventional LTE system as it is. Further, such feedback is even applicable to a case where the uplink system bandwidth and the downlink system bandwidth do not coincide with each other, which case would be generated with the next generation wireless communication system.

Further, in order to attain the object, a user device of the present invention, for use in a communication system in which the user device and a base station are wirelessly communicable with each other when the user device is in a cell of the base station, includes: sending/receiving means for sending/receiving signaling and data to/from the base station; feedback information generation means for (i) detecting each of a downlink basic bandwidth(s) which has been allocated to the user device among a plurality of downlink basic bandwidths into which a downlink system bandwidth of the communication system is divided, and (ii) generating, for each of the downlink basic bandwidth(s) allocated to the user device, uplink control signaling information to be fed back to the base station; and information feedback means for (i) determining a format of a corresponding uplink control channel on the basis of content of the uplink control signaling information in each of the downlink basic bandwidth(s) allocated to the user device, and (ii) mapping the uplink control signaling information on a corresponding piece of an uplink resource on the basis of a sequence(s) which has been allocated to the user device by the base station, so as to feed back the uplink control signaling information to the base station.

According to the arrangement, the user device (i) detects each of the downlink basic bandwidth(s) allocated to the user device, (ii) obtains, for each of the downlink basic bandwidth(s) allocated to the user device, the information to be fed back, and (iii) feeds back the information to the base station on the basis of the sequence(s) allocated to the user device by the base station.

Further, in order to attain the object, a communication system of the present invention includes the foregoing base station and the foregoing user device.

Note that the base station and the user device can be realized by a computer. In this case, the scope of the present invention encompasses: a program for controlling the base station, which realizes the base station on a computer by causing the computer to function as each of the foregoing means of the base station; a program for controlling the user device, which realizes the user device on a computer by causing the computer to function as each of the foregoing means of the user device; and a computer-readable storage medium in which at least one of the program for controlling the base station and the program for controlling the user device is stored.

Advantageous Effects of Invention

According to the method and arrangements described above, the feedback resource of the uplink is increased. Therefore, the user device can use an existing feedback mechanism of the LTE system when feeding back the uplink control signaling in each of the downlink basic bandwidths allocated to the user device. This (i) solves the problem generated by the fact that the uplink system bandwidth and the downlink system bandwidth of the LTE-Advanced system do not coincide with each other, and also (ii) ensures a smooth change from the LTE system to the LTE-Advanced system.

BRIEF DESCRIPTION OF DRAWINGS

Preferable examples of the present invention will be described below with reference to the attached drawings. The foregoing object, features, and advantages of the present invention can be understood more clearly with such examples.

DESCRIPTION OF EMBODIMENTS

A preferable embodiment of the present invention is described below with reference to drawings. Note that details and functions which are unnecessary for the present invention to be understood are omitted here so that the present invention is clearly understood.

Further, specific examples of the present invention are described below so that an embodiment for realizing the present invention is fully understood in detail. These examples are applicable to a cellular mobile communication system compatible with LTE-Advanced. Note, however, that the present invention is not limited to what is described in these specific examples and is applicable to other mobile communication systems.

Figure 1:
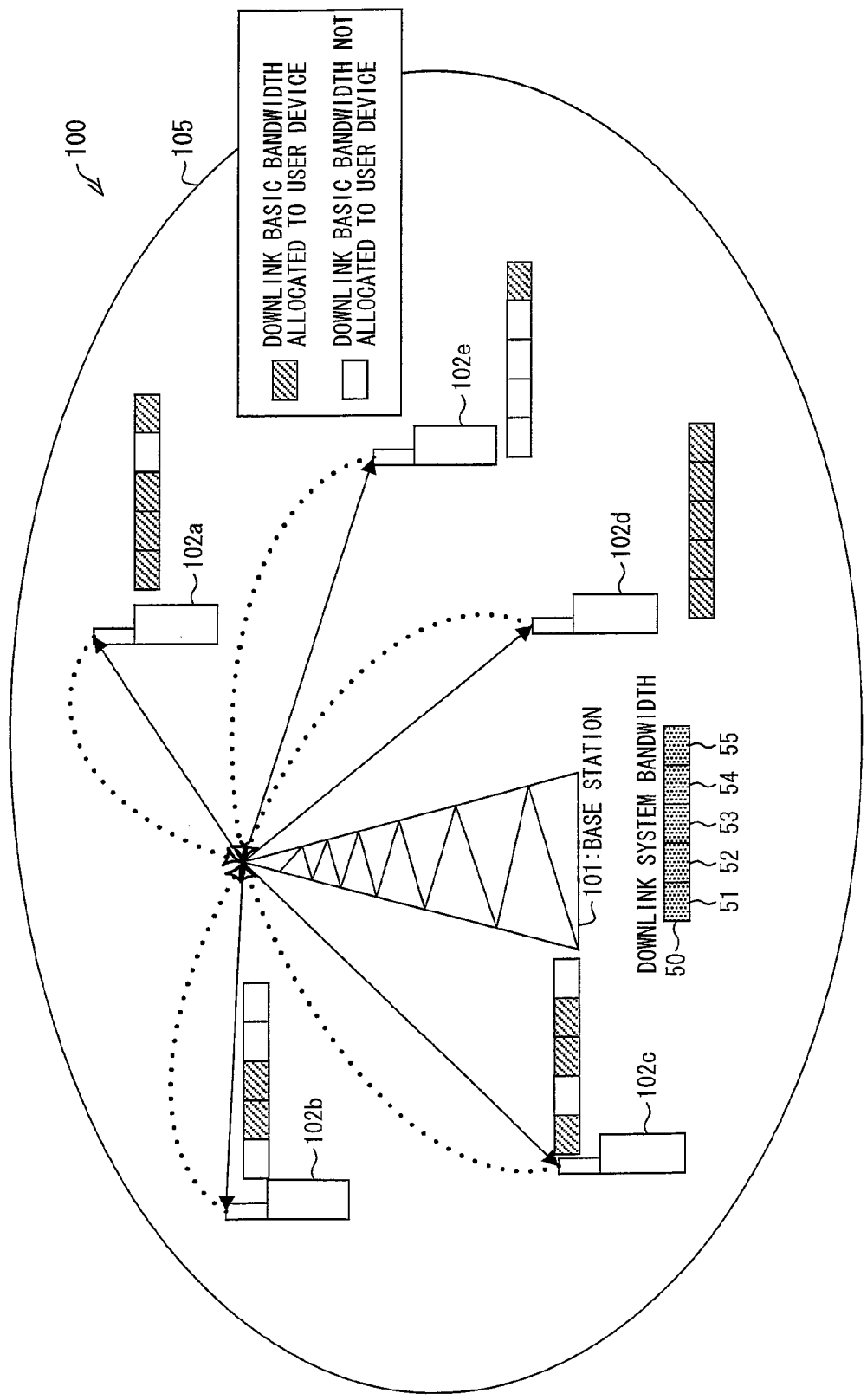
FIG. 1 is a view schematically illustrating an LTE-Advanced system in accordance with an embodiment of the present invention.

FIG. 1 is a view schematically illustrating an LTE-Advanced system 100. The LTE-Advanced system 100 of the present embodiment includes a single base station (eNode B) 101 and a plurality of user devices 102 (user devices 102a through 102e) in a single wireless cell (cell) 105. Note that the plurality of user devices 102a through 102e are merely referred to as the "user device 102" in the following descriptions in a case where a corresponding description is directed to not a specific one of the plurality of user devices 102a through 102e but any one of the plurality of user devices 102a through 102e. The base station 101 illustrated in FIG. 1 is a service control center of the communication system 100, and carries out (i) resource scheduling of the user device 102 in the wireless cell 105 and (ii) transmission of data related to data services.

The communication system 100 employs a downlink bandwidth (hereinafter, referred to as "downlink system bandwidth") 50 of 100 MHz. The base station 101 divides the downlink system bandwidth 50 into downlink basic bandwidths of 20 MHz (i.e. downlink basic bandwidths 51 through 55). Note that an uplink system bandwidth is also divided into a plurality of uplink basic bandwidths. Such a plurality of downlink basic bandwidths and a plurality of uplink basic bandwidths are also called "component carriers". The plurality of user devices 102 are distributed randomly in the wireless cell 105. Each of the plurality of user devices 102 has its downlink bandwidth which is determined by the base station 101 on the basis of a type of a service that is being received on that user device 102, a channel condition, and other elements. Such a downlink bandwidth of the user device 102 may be identical with an entire downlink system bandwidth, or a single or a plurality of downlink basic bandwidths.

For example, FIG. 1 illustrates an example in which the downlink bandwidth of 100 MHz is divided into the downlink basic bandwidths 51 through 55 of 20 MHz, among which the downlink basic bandwidths 51, 52, 53, and 55 are allocated to the user device 102a. To the user device 102b, the downlink basic bandwidths 52 and 53 are allocated. To the user device 102c, the downlink basic bandwidths 51, 53, and 54 are allocated. To the user device 102d, all of the downlink basic bandwidths 51 through 55 are allocated. To the user device 102e, the downlink basic bandwidth 55 is allocated.

The present embodiment deals with a case where there are five user devices 102a through 102e in the wireless cell 105. Note, however, that the number of the user devices 102 is not limited to this.

Figure 2:
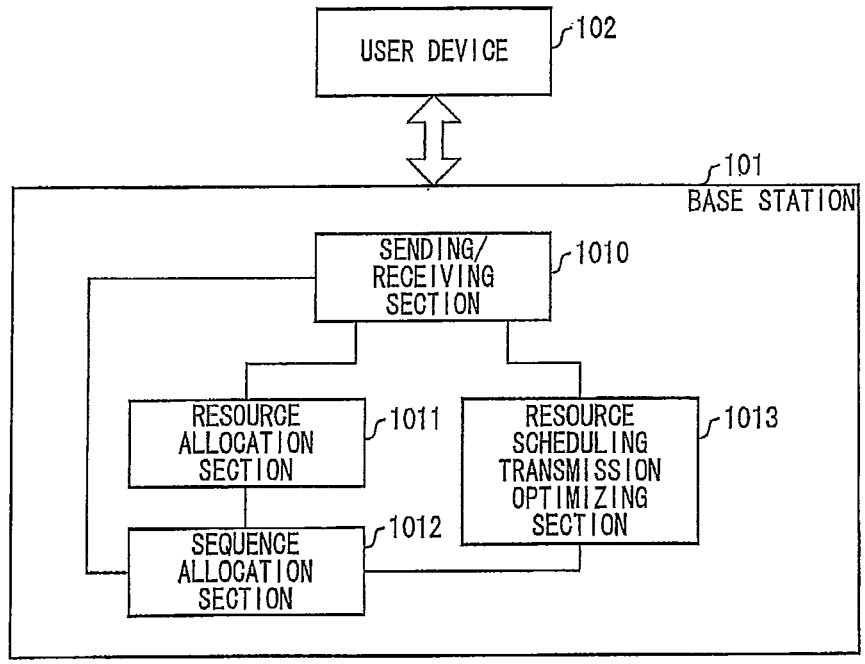
FIG. 2 is a block diagram illustrating a base station included in the LTE-Advanced system.

FIG. 2 is a block diagram illustrating a main part of the base station 101 of the present embodiment. The base station 101 of the present embodiment includes sending/receiving section (sending/receiving means) 1010, a resource allocation section (resource allocation means) 1011, a sequence allocation section (sequence allocation means) 1012, and a resource scheduling transmission optimizing section (resource scheduling transmission optimizing means) 1013 (see FIG. 2).

The sending/receiving section 1010 sends/receives control signaling and user data to/from the user device 102 in the wireless cell 105.

The resource allocation section 1011 divides the downlink system bandwidth into a plurality of downlink basic bandwidths, and allocates a piece of a resource of an uplink control channel to each of the downlink basic bandwidth thus obtained. Further, the resource allocation section 1011 simultaneously allocates resource blocks to an uplink control channel PUCCH (Physical Uplink Control Channel) which includes uplink control signaling information.

In order to feed back, to the base station 101, the uplink control signaling information included in the uplink basic bandwidth corresponding to the user device 102, the sequence allocation section 1012 carries out, on the basis of the number of the downlink basic bandwidths allocated to the user device 102, allocation of (i) resource blocks of frequency ranges and/or (ii) sequences, either of which indicate pieces of a resource of uplink control signaling information in the uplink basic bandwidth, which pieces correspond to the downlink basic bandwidths allocated to the user device 102. A single sequence corresponds to a piece of the resource of the uplink control signaling information. Further, the single sequence allocated to the user device 102 corresponds to a piece of the resource of an uplink control channel of a corresponding single uplink basic bandwidth in the uplink system bandwidth.

The resource scheduling transmission optimizing section 1013 obtains feedback information in the uplink basic bandwidth allocated to the user device 102, i.e., the uplink control signaling information, on the basis of the known sequence allocated to the user device 102 by the sequence allocation section 1012. Then, the resource scheduling transmission optimizing section 1013 optimizes downlink resource scheduling and downlink transmission in accordance with (i) downlink CQI (channel quality indicator) and (ii) a response (ACK/NACK) to a hybrid automatic repeat request (HARQ), which CQI and ACK/NACK are included in the uplink control signaling information thus obtained. Here, the optimization is carried out by use of an algorithm defined in a 3GPP specification. For example, in accordance with (i) the downlink CQI (channel quality indicator) obtained from the uplink control signaling information (ii) a downlink data amount of the user device 102 and (iii) a downlink data amount of the entire system, the resource scheduling transmission optimizing section 1013 carries out allocation of data resource blocks of the user device 102 and/or data resource blocks of the entire system in a PDSCH (physical downlink shared channel) so that (i) a data transmission throughput of the user device 102 becomes its maximum or (ii) an average data transmission throughput of all of the plurality of user devices 102 in the system becomes its maximum. Further, the resource scheduling transmission optimizing section 1013 transmits data of the user device 102 to the user device 102 again in response to the response (ACK/NACK) to the hybrid automatic repeat request HARQ.

Figure 3:
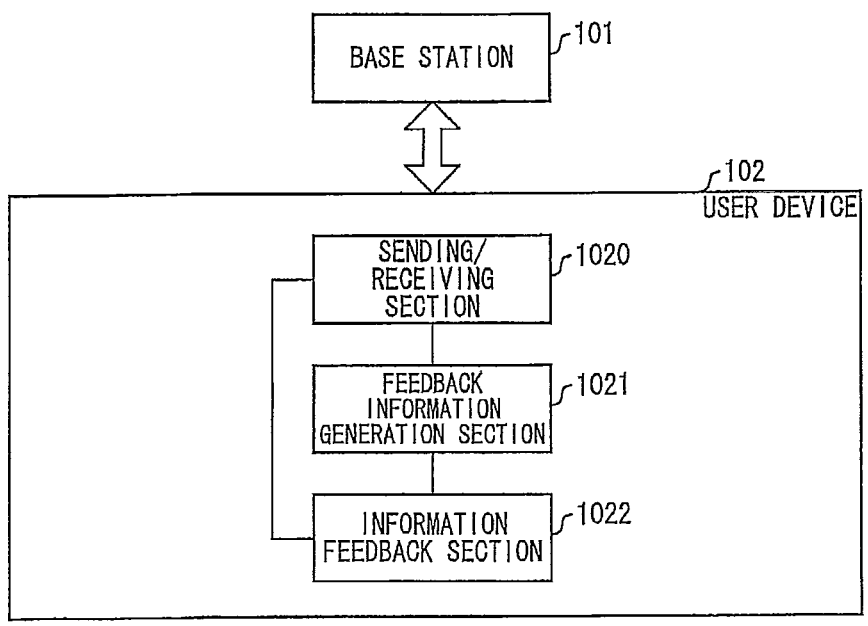
FIG. 3 is a block diagram illustrating a user device compatible with LTE-Advanced, in accordance with the embodiment of the present invention.

FIG. 3 is a block diagram illustrating a main part of the user device 102 of the present embodiment. The user device 102 of the present embodiment includes a sending/receiving section (sending/receiving means) 1020, a feedback information (uplink control signaling information) generation section (feedback information generation means) 1021, and information feedback section (information feedback means) 1022 (see FIG. 3).

The sending/receiving section 1020 sends/receives the control signaling and the user data to/from the base station 101.

The feedback information generation section 1021 carries out detection of each of the downlink basic bandwidths allocated to the user device 102, and generates, for each of the downlink basic bandwidths, the feedback information (i.e. the uplink control signaling information) to be fed back to the base station 101.

The information feedback section 1022 maps the feedback information of each of the uplink basic bandwidths, generated by the feedback generation section 1021, on a corresponding piece of a resource of the uplink control information, on the basis of the sequence allocated to the user device by the sequence allocation section 1012 of the base station 101. Such mapping is carried out by use of an appropriate format of the uplink control channel, defined by the 3GPP specification. The information feedback section 1022 thus feeds back the feedback information to the base station 101.

FIGS. 2 and 3 specifically illustrate how the respective base station 101 and user device 102 of the present embodiment are constituted by modules (i.e. the sections described above). Note, however, that it is obvious for a person skilled in the art that the present embodiment is not limited to the specific modules described above and can be realized (i) by integrating, dividing, or differently combining part of or all of such modules, or (ii) by software, hardware, or their combination.

For a specific arrangement of the LTE system of the present embodiment and a specific mechanism for the uplink and downlink, TS36.213V8.3.0, "Evolved Universe LTE terrestrial Radio Access (E-UTRA); Physical Layer Procedures", by 3GPP (the international organization for standardization), may be cited as a reference.

For a specific method for carrying out the mapping with respect to a physical resource of the uplink control channel of the LTE system of the present embodiment, TS36.211V8.3.0, "Evolved universal terrestrial Radio Access (E-UTRA); Physical Channels and Modulation", by 3GPP (the international organization for standardization), may be cited as a reference.

Figure 4:
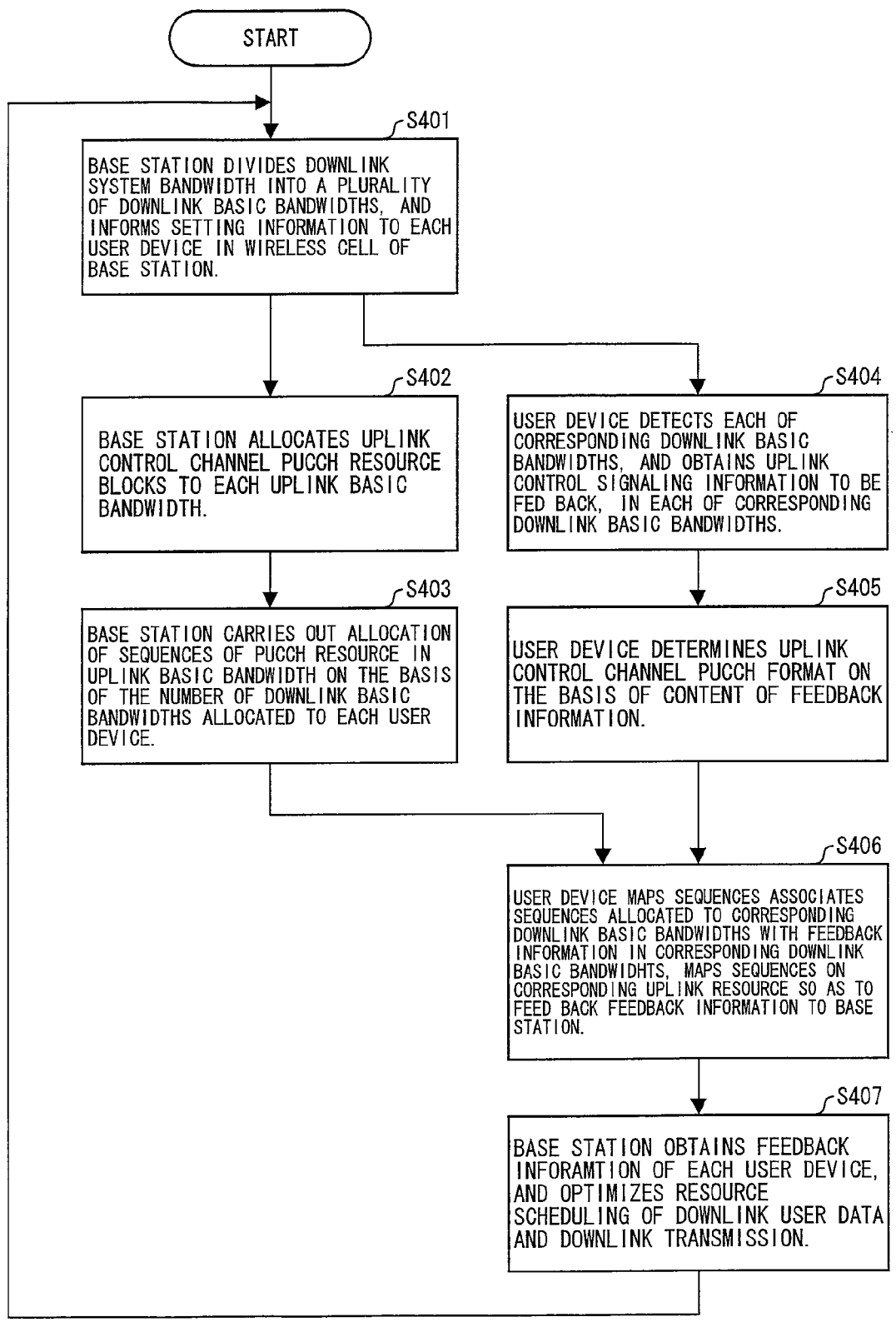
FIG. 4 is a flowchart showing how a method for feeding back uplink control signaling is carried out, in accordance with the embodiment of the present invention.

FIG. 4 is a flowchart showing how the uplink control signaling information is fed back in accordance with the present embodiment.

The following description explains how the uplink control signaling information is fed back in the LTE-Advanced system of the present embodiment in detail with reference to FIGS. 4 through 17.

(Step for Informing Uplink/Downlink Basic Bandwidth Setting Information, Carried Out by Base Station (S401))

Figure 5:
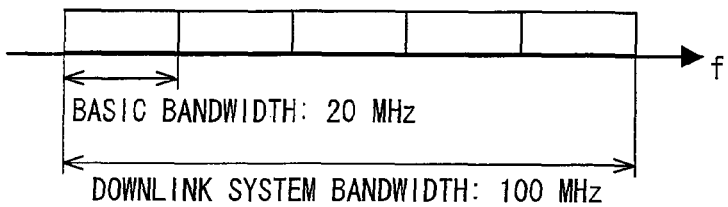
FIG. 5 is a view illustrating how a downlink system bandwidth is divided into a plurality of downlink basic bandwidths by a resource allocation section of the base station.

First, the resource allocation section 1011 of the base station 101 (i) divides the uplink/downlink system bandwidth into a plurality of basic bandwidths, and (ii) informs, via upper layer signaling, to each of the plurality of user devices 102 in the wireless cell 105 of the base station 101, setting information indicating the uplink and downlink basic bandwidths allocated to such a user device 102 (S401). FIG. 5 illustrates how the downlink system bandwidth is divided into a plurality of downlink basic bandwidths by the resource allocation section 1011 of the base station 101.

Then, the resource allocation section 1011 of the base station 101 allocates the resource blocks to the uplink control channel PUCCH (Physical Uplink Control Channel) which includes the uplink control signaling information (S402). The uplink system bandwidth of the present embodiment is 40 MHz, which is equal to two uplink basic bandwidths. Uplink transmission can be carried out by SC-FDMA (Single-Carrier FDMA), OFDMA (Orthogonal Frequency Division Multiple Access), or their combination.

(Step for Allocating PUCCH Resource Blocks, Carried Out by Base Station (S402))

The following description deals with three specific examples each showing how the uplink control channel PUCCH resource blocks are allocated by the resource allocation section 1011 of the base station 101 of the present embodiment (which corresponds to S402).

Specific Example 1-1

Figure 6:
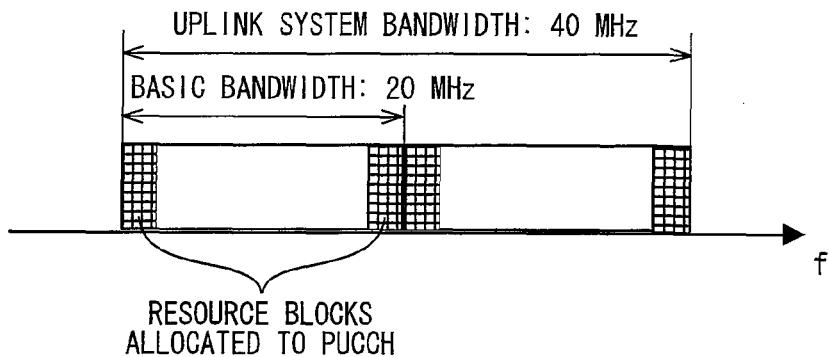
FIG. 6 is a view illustrating how PUCCH resource blocks are equally allocated to uplink basic bandwidths in an uplink system bandwidth by the base station.

FIG. 6 is a view illustrating how the PUCCH resource blocks are equally allocated to the uplink basic bandwidths by the base station 101 on the basis of the uplink system bandwidth. According to the present specific example, the PUCCH resource blocks in the uplink system bandwidth are equally allocated to each of the plurality of uplink basic bandwidths (see FIG. 6). This example is particularly preferable in a case where the uplink system bandwidth and the downlink system bandwidth are equal to each other.

Specific Example 1-2

Figure 7:
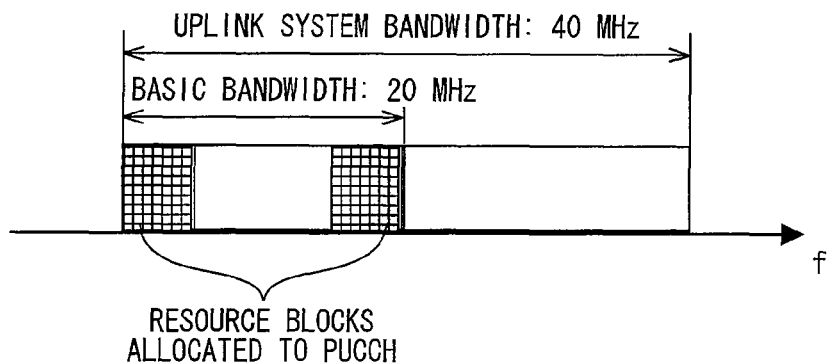
FIG. 7 is a view illustrating how the PUCCH resource blocks are allocated to a single uplink basic bandwidth in the uplink system bandwidth by the base station.

FIG. 7 is a view illustrating how all of the PUCCH resource blocks are allocated to one of the plurality of uplink basic bandwidths in the uplink system bandwidth by the base station 101. According to the present specific example, all of the PUCCH resource blocks are aggregated in a first uplink basic bandwidth (a left uplink basic bandwidth shown in FIG. 7), while no PUCCH resource block is allocated to a second uplink basic bandwidth (a right uplink basic bandwidth shown in FIG. 7).

Specific Example 1-3

Figure 8:
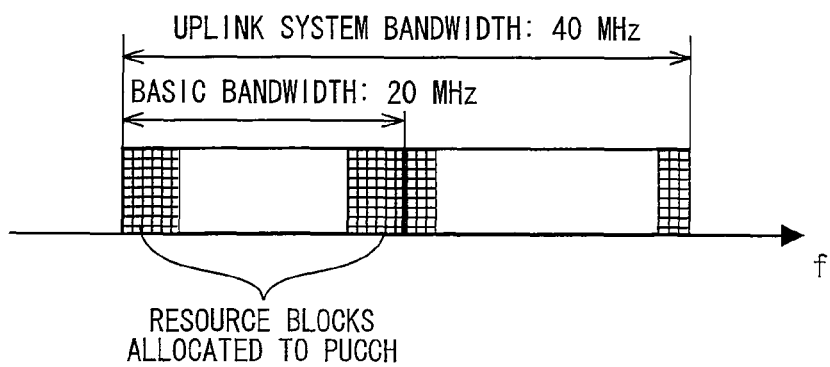
FIG. 8 is a view illustrating how the PUCCH resource blocks are arbitrarily allocated to two uplink basic bandwidths in the uplink system bandwidth.

FIG. 8 is a view illustrating how the PUCCH resource blocks are arbitrarily allocated to two uplink basic bandwidths in the uplink system bandwidth by the base station 101. According to the present specific example, n pieces of the PUCCH resource blocks are allocated to the first uplink basic bandwidth (the left uplink basic bandwidth shown in FIG. 8), as illustrated in FIG. 8. Accordingly, the number of PUCCH resource blocks, allocated to the second uplink basic bandwidth (the right uplink basic bandwidth shown in FIG. 8) can be obtained by subtracting the number n (which is the number of the PUCCH resource blocks allocated to the first uplink basic bandwidth) from a total number of the PUCCH resource blocks in the entire uplink system bandwidth. This example allows the PUCCH resource blocks to be arbitrarily allocated to two uplink basic bandwidths.

How to allocate the PUCCH resource blocks in the foregoing three specific examples is specifically described in TS36.211V8.3.0, "Evolved Universe LTE Terrestrial Radio Access (E-UTRA); Physical Channels and Modulation", by 3GPP (the international organization for standardization). The base station 101 informs the setting information to each of the plurality of user devices 102 in the wireless cell 105 of the base station 101.

(Step for Allocating Sequences of PUCCH Resource, Carried Out by Base Station (S403))

The sequence allocation section 1012 of the base station 101 carries out allocation of sequences of the PUCCH resource of the uplink signaling information in the uplink basic bandwidth on the basis of the number of downlink basic bandwidths allocated to the user device 102, so that the user device 102 feeds back, to the base station 101, the uplink control signaling information (i.e. the feedback information) included in the uplink basic bandwidth allocated to the user device 102 (S403).

Figure 11:
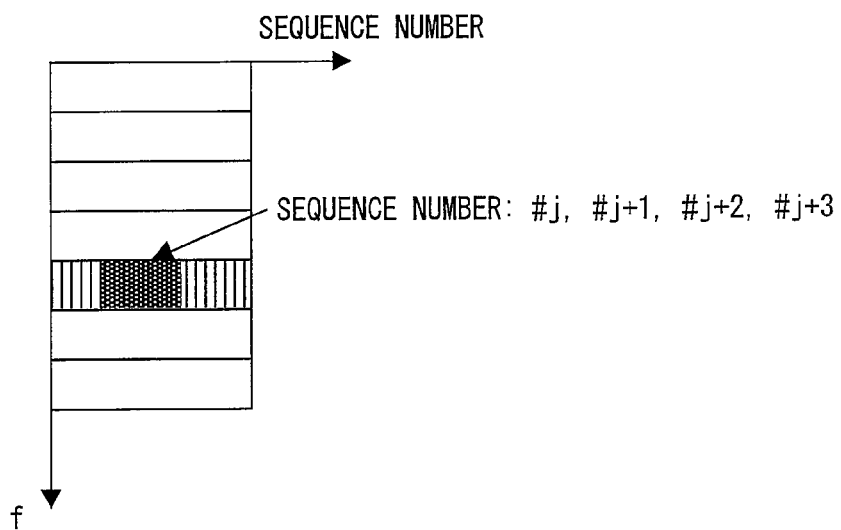
FIG. 11 is a view illustrating how the PUCCH resource is sectionalized (divided) in accordance with the embodiment of the present invention, in which code multiplex is carried out in a resource block of a single frequency range by use of a plurality of sequence numbers.

The PUCCH resource is constituted by the plurality of PUCCH resource blocks which are frequency ranges and a plurality of cyclic shift sequences CS (Cyclic Shift) which are obtained by causing a single sequence to be subjected to cyclic-shifting. FIG. 11 illustrates an arrangement of the PUCCH resource, in which the PUCCH resource is constituted by the plurality of PUCCH resource blocks (horizontally-long rectangles shown in FIG. 11) defined by frequency axes (f), and a plurality of cyclic shift sequences CS (vertically-long rectangles shown in FIG. 11) defined by sequence number axes. A single PUCCH resource block includes 12 cyclic shift sequences CS (hereinafter, merely referred to as "sequence").

The following description deals with three specific examples each showing how the sequence numbers are allocated to pieces of the PUCCH resource in the uplink basic bandwidth by the sequence allocation section 1012 of the base station 101 on the basis of the number of the plurality of downlink basic bandwidths allocated to the user device 102.

According to Example 1, the pieces of the PUCCH resource of the uplink control signaling information, corresponding to the sequence numbers thus allocated, are in a single uplink basic bandwidth with respect to a single user device 102, regardless of the number of the downlink basic bandwidths allocated to the user device 102. This corresponds to the case illustrated in FIG. 7, for example.

According to Example 2, the pieces of the PUCCH resource of the uplink control signaling information, corresponding to the sequence numbers thus allocated, are in a plurality of uplink basic bandwidths with respect to a single user device 102, in accordance with the number of the downlink basic bandwidths allocated to the user device 102. This corresponds to either the case illustrated in FIG. 6 or the case illustrated in FIG. 8, for example.

Example 3 shows a case where the uplink system bandwidth and the downlink system bandwidth are equal to each other. According to Example 3, with respect to a single user device 102, the pieces of PUCCH resource of the uplink control signaling information, corresponding to the sequence numbers thus allocated, are in uplink basic bandwidths corresponding to the downlink basic bandwidths allocated to the user device 102.

Figure 9:
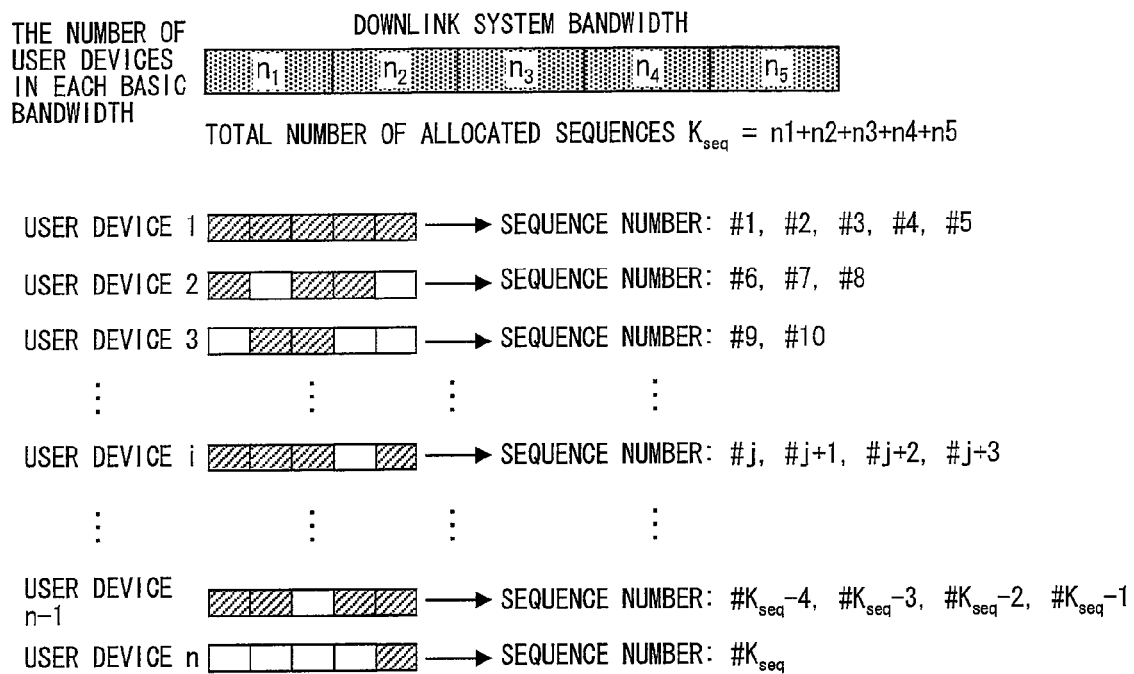
FIG. 9 is a view illustrating how sequence numbers are allocated in accordance with the number of downlink basic bandwidths allocated to each user device.

Unlike Examples 1 through 3, FIG. 9 illustrates how to allocate the sequence numbers in accordance with the number of downlink basic bandwidths allocated to each of the plurality of user devices 102. In the example illustrated in FIG. 9, there are n1 pieces, n2 pieces, n3 pieces, n4 pieces, and n5 pieces of the plurality of user devices 102 in respective downlink basic bandwidths 95, 96, 97, 98, and 99 of a downlink system bandwidth 91. The total number of sequences thus allocated is #$K_{seq}$, which is equal to the total number of the plurality of user devices 102. Five contiguous downlink basic bandwidths are allocated to a first user device 102 so that the pieces of the PUCCH resource, corresponding to the sequence numbers #1 through #5 which correspond to the respective five contiguous downlink basic bandwidths, are allocated to the first user device 102. Non-contiguous three downlink basic bandwidths are allocated to a second user device 102 so that the pieces of the PUCCH resource, corresponding to the sequence numbers #6 through #8 which correspond to the respective non-contiguous three downlink basic bandwidths, are allocated to the second user device 102.

In the similar manner, a single downlink basic bandwidth is allocated to the nth user device 102 so that the piece of the PUCCH resource, corresponding to the sequence number #$K_{seq}$ which corresponds to the single downlink basic bandwidth, is allocated to the nth user device 102.

Figure 10:
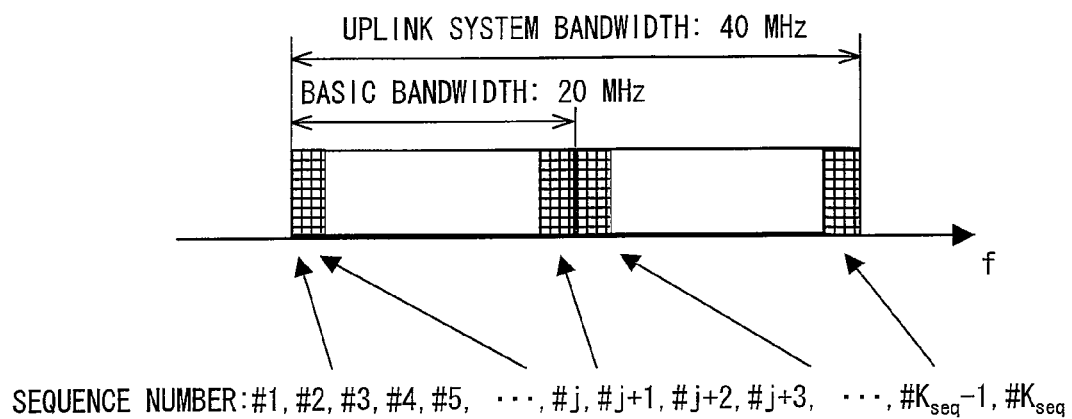
FIG. 10 is a view illustrating how to allocate the PUCCH resource blocks to two uplink basic bandwidths in accordance with the #$K_{seq}$ sequence numbers.

FIG. 10 is a view illustrating how to allocate the pieces of the PUCCH resource, corresponding to the respective #$K_{seq}$ sequence numbers, to two uplink basic bandwidths. The #$K_{seq}$ sequence numbers are allocated, in a dispersed manner, to corresponding pieces of the PUCCH resource, in accordance with the number of the PUCCH resource blocks allocated in the uplink (in S402). For example, the pieces of the PUCCH resource, which correspond to the respective sequence numbers #1 through #5 and are allocated to the first user device 102 (see FIG. 9), are provided in a first uplink basic bandwidth (the left uplink basic bandwidth shown in FIG. 10). In the similar manner, the piece of the PUCCH resource, which corresponds to the sequence number #$K_{seq}$ and is allocated to the nth user device 102 (see FIG. 9), is provided in a second uplink basic bandwidth (the right uplink basic bandwidth shown in FIG. 10).

The PUCCH resource includes (i) a frequency range resource (the resource blocks) and (ii) a sequence (code) range resource (see FIG. 11).

Figure 12:
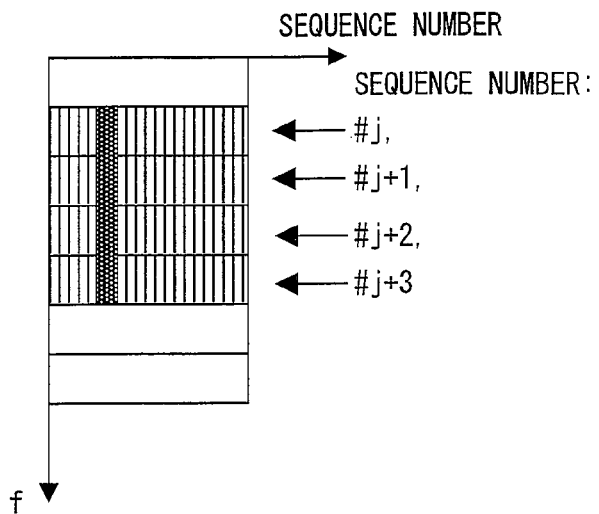
FIG. 12 is a view illustrating how the PUCCH resource is sectionalized (divided) in accordance with the embodiment of the present invention, in which frequency multiplex is carried out by use of a plurality of resource blocks of different frequency ranges.
Figure 13:
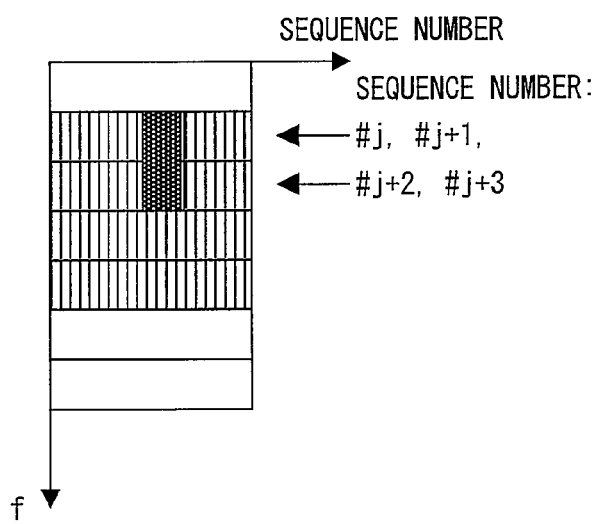
FIG. 13 is a view illustrating how the PUCCH resource is sectionalized (divided) in accordance with the embodiment of the present invention, in which the code multiplex and the frequency multiplex are carried out simultaneously.

The following description deals with three examples each showing how to sectionalize the PUCCH resource information, with reference to FIG. 11 through 13. Each of FIGS. 11 through 13 shows how to sectionalize (divide) the PUCCH resource. Note that each of FIGS. 11 through 13 employs a vertical axis for indicating the frequencies (f) and a horizontal axis for indicating the sequence numbers.

Specific Example 2-1

A single user device 102 feeds back the uplink control signaling information by use of a single uplink basic bandwidth. The sequence numbers allocated to the user device 102 are mapped (allocated) on a resource block of a single frequency range. Pieces of the uplink control signaling information, corresponding to different downlink basic bandwidths, are defined by sequence by use of different sequence numbers (code multiplex). FIG. 11 is a view illustrating how code multiplex is carried out by use of a plurality of sequence numbers in a resource block of a single frequency region.

Specific Example 2-2

A single user device 102 feeds back the uplink control signaling by use of a single uplink basic bandwidth. The sequence numbers allocated to the user device are identical with each other and are mapped (allocated) on M contiguous resource blocks of different frequency ranges. Here, "M" is equal to the number of the downlink basic bandwidths for each of which the user device 102 is to feed back the uplink control signaling information. Accordingly, pieces of the feedback information, corresponding to different downlink basic bandwidths, are defined by frequency by use of resource blocks of different frequency ranges (frequency multiplex). FIG. 12 is a view illustrating how frequency multiplex is carried out by use of a single sequence number and resource blocks of different frequency ranges.

Specific Example 2-3

A single user device 102 feeds back the uplink control signaling by use of a single uplink basic bandwidth. According to Specific Example 2-3, in a case where the sequence numbers allocated to the user device 102 are identical with each other, the sequence numbers are mapped (allocated) on contiguous resource blocks of different frequency ranges. Further, in a case where different sequence numbers are allocated to the user device 102, the different sequence numbers are mapped (allocated) on a single resource block of a single frequency range. Accordingly, the pieces of the feedback information, corresponding to different downlink basic bandwidths, are defined (i) by code by use of different sequence numbers or (ii) by frequency by use of resource blocks of different frequency ranges. FIG. 13 is a view showing how the code multiplex and the frequency multiplex are carried out simultaneously.

(Step for Generating Feedback Information, Carried Out by User Device (S404))

Next, the feedback information generation section 1021 of the user device 102 carries out detection for each of the downlink basic bandwidths allocated to the user device 102, and generates, for each of the downlink basic bandwidths, the uplink control signaling information (i.e. the feedback information) to be fed back (S404).

Figure 14:
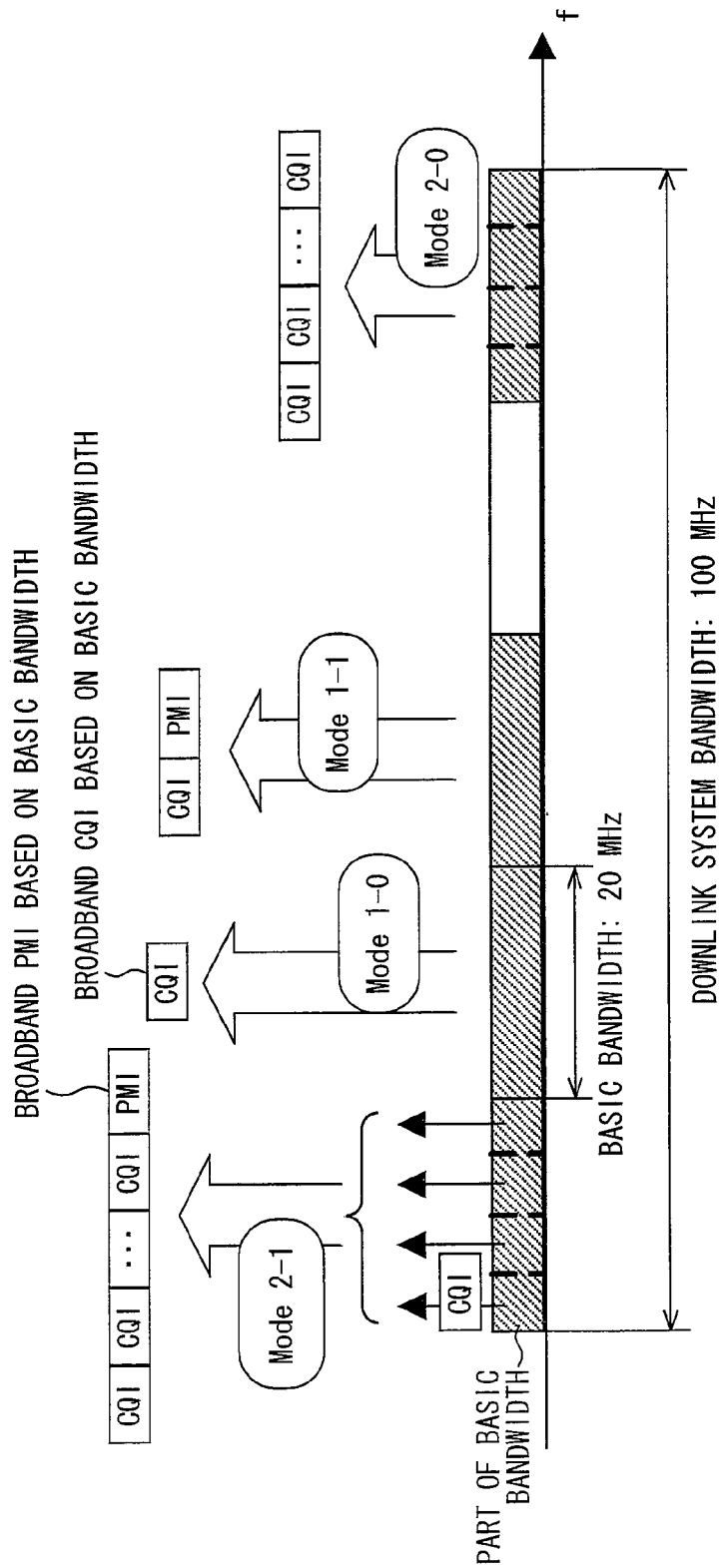
FIG. 14 is a view illustrating how the user device carries out cyclic CQI feedback for each of the downlink basic bandwidths allocated to the user device.
Figure 15:
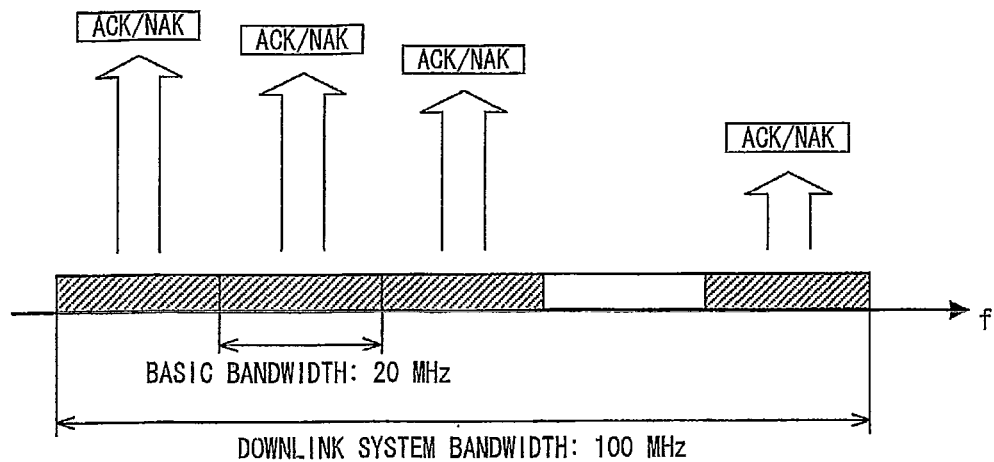
FIG. 15 is a view illustrating how the user device carries out ACK/NAK feedback for each of the downlink basic bandwidths allocated to the user device.
Figure 16:
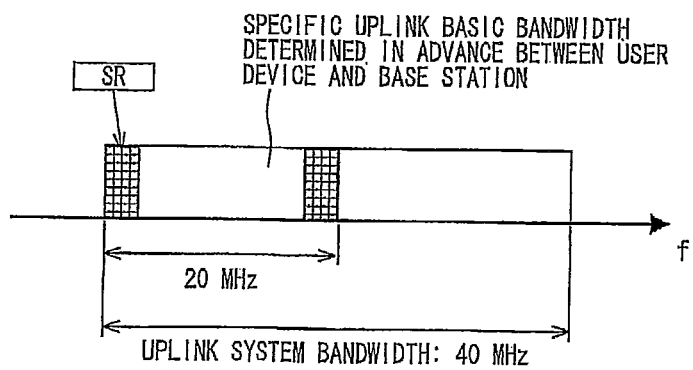
FIG. 16 is a view illustrating how the user device transmits an uplink resource scheduling request SR (Scheduling Request) for transmitting uplink data.

The following description deals with three specific examples each showing how a process of the step S404 proceeds, with reference to FIGS. 14 through 16. Each of FIGS. 14 through 16 illustrates how the process is carried out by the feedback information generation section 1021.

Specific Example 3-1

FIG. 14 is a view illustrating how the user device 102 carries out cyclic CQI feedback with respect to the downlink basic bandwidths allocated to the user device 102. For the cyclic CQI (channel quality indicator) feedback, the user device 102 carries out calculation with respect to the CQI in each of the downlink basic bandwidths which have been allocated to the user device 102 by the base station 101, on the basis of an operation mode in each of the downlink basic bandwidths thus allocated (see FIG. 14). Such calculation is carried out on the basis of a feedback mode described in a known LTE Release 8 (Rel-8) specification.

Specific Example 3-2

FIG. 15 is a view illustrating how the user device 102 carries out ACK/NACK feedback with respect to the downlink basic bandwidths allocated to the user device 102. For the HARQ (hybrid automatic repeat request) feedback, the user device makes a response (ACK/NACK) to a HARQ (hybrid automatic repeat request) transmitted from the base station 101 to each of the downlink basic bandwidths thus allocated (see FIG. 15).

Specific Example 3-3

FIG. 16 is a view illustrating how the user device 102 transmits an uplink resource scheduling request SR for transmitting uplink data. For the transmission of the scheduling request SR, the user device 102 transmits, in response to a request for uplink data transmission, the scheduling request SR to the base station 101 via a specific uplink basic bandwidth which has been determined in advance between the user device 102 and the base station 101 (see FIG. 16).

Further, on the basis of the downlink basic bandwidths allocated to the user device 102, the user device 102 feeds back information of a combination of ACK/NACK and CQI to the base station 101.

(Step for Determining PUCCH Format, Carried Out by User Device (S405))

The information feedback section 1022 of the user device 102 determines a format of the uplink control channel PUCCH on the basis of content of the feedback information in each of the downlink basic bandwidths thus allocated (S405). Such determination is carried out on the basis of a mechanism of a known LTE system. The feedback information can be SR, ACK/NACK, CQI, or any combination thereof, for example. The format of the uplink control channel PUCCH may be specifically determined on the basis of content of TS36.213V8.3.0 and TS36.211V8.3.0, by the international organization 3GPP for standardization.

(Step for Feeding Back, Carried Out by User Device (S406))

Figure 17:
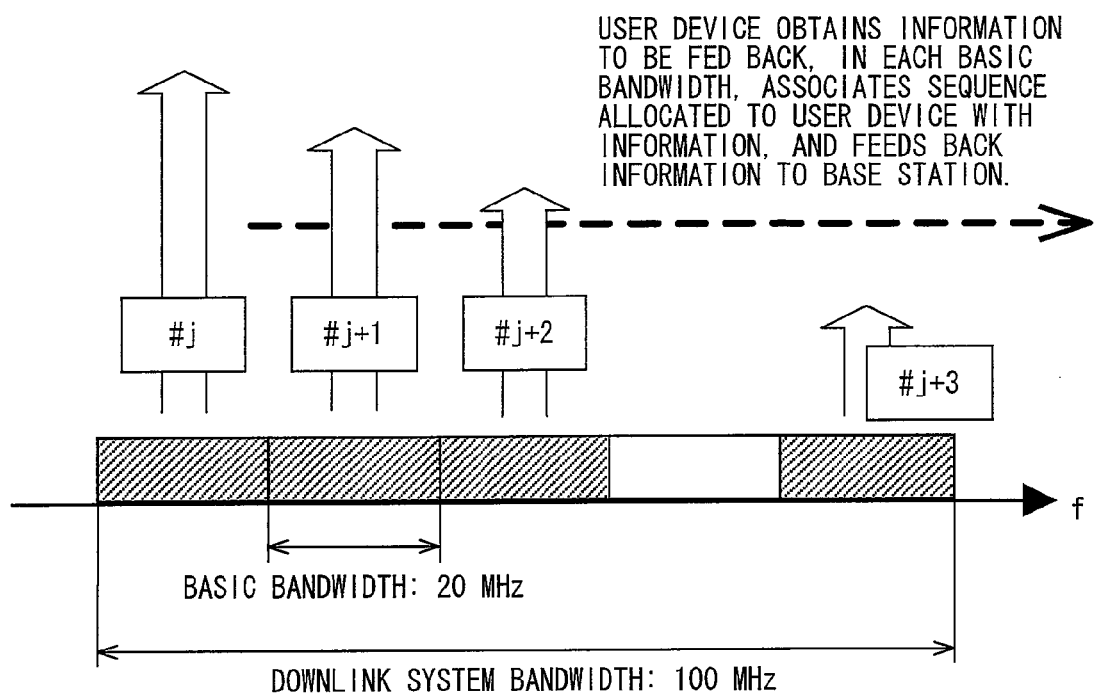
FIG. 17 is a view illustrating how the user device feeds back uplink control signaling in the uplink basic bandwidth to the base station on the basis of (i) the downlink basic bandwidths allocated to the user device and (ii) sequence numbers corresponding to the downlink basic bandwidths.

The information feedback section 1022 of the user device 102 (i) associates the sequences allocated to the user device 102 with the target feedback information in the downlink basic bandwidths thus allocated, and (ii) maps, on corresponding pieces of the uplink resource, the feedback information by use of the sequences thus allocated, so as to feed back the feedback information to the base station 101 (S406). FIG. 17 illustrates how the process is carried out by the information feedback section 1022. FIG. 17 is a view illustrating how the user device 102 feeds back, to the base station 101, the uplink control signaling information in the uplink basic bandwidth (i.e. the feedback information) on the basis of (i) the downlink basic bandwidths allocated to the user device 102 and (ii) corresponding sequence numbers.

(Step for Allocating Downlink User Data Resource Carried Out by Base Station (S407))

The resource scheduling transmission optimizing section 1013 of the base station 101 obtains the feedback information related to each of the downlink basic bandwidths of each user device 102 by use of the known sequence numbers, and optimizes (i) the resource scheduling (allocation) of the downlink user data and (ii) downlink transmission (S407).

Then, the steps S401 through S407 are repeated.

It becomes thus possible to ensure normal communication between the base station 101 and all of the plurality of user devices 102 in the wireless cell 105 by repeating the steps S401 through 406 (see FIG. 4).

As described above, the present embodiment of the present invention provides the following method for feeding back the uplink control signaling information. That is, the base station 101 allocates the resource blocks to the uplink control channel PUCCH. Further, the base station 101 also allocates the sequence(s) to each of the user devices 102 on the basis of the number of the downlink basic bandwidth(s), so that the downlink control signaling information related to the uplink control information of each user device 102 is fed back. Each user device 102 works out the feedback information of the uplink control signaling information in each of the system bandwidths based on the sequence(s) thus allocated, and feeds back the feedback information to the base station 101 by use of the piece of the resource, corresponding to each of the sequence(s). This solves the problem of how to feed back the uplink control signaling information in a case where the uplink system bandwidth and the downlink system bandwidth in the LTE-Advanced system are asymmetric to each other. Further, it is also possible to ensure a smooth change from the LTE system to the LTE-Advanced system because the mechanism related to the conventional LTE system can be used as it is in the LTE-Advanced system. For the reasons described above, the technical method of the present embodiment of the present invention is applicable to modulations in practice, and provides an important logical basis and a specific method for realizing the present invention to systems such as Beyond the 3rd Generation (B3G) Mobile Communication System, the 4th Generation Mobile Communication System, a digital television broadcasting, the WLAN (Wireless Local Access Network), the Mesh, AdHoc, Censor Network (self-organizing network), the e-Home, and WWAN (Wireless Wide area Access Network).

The present invention is not limited to the descriptions of the embodiment above, but may be altered by a skilled person within the scope of the claims. An embodiment based on a proper combination of technical means disclosed in different embodiments is encompassed in the technical scope of the present invention.

Last but not least, the blocks of the base station 101 and the user device 102, particularly, the sending/receiving section 1010, the resource allocation section 1011, the sequence allocation section 1012, the resource scheduling transmission optimizing section 1013 of the base station 101, and the sending/receiving section 1020, the feedback information generation section 1021, the information feedback section 1022 of the user device 102, can be realized by a hardware logic or by software by use of a CPU (Central Processing Unit) as described below.

That is, each of the base station 101 and the user device 102 includes: the CPU (central processing unit) which executes an instruction of a control program realizing each of the functions described above; a ROM (read only memory) in which the program is stored; a RAM (random access memory) which develops the program; a storage device (storage medium), such as a memory, in which the program and various kinds of data are stored; and the like. Further, the object of the present invention can be achieved in the following manner: (i) a storage medium for computer-readably storing a program code (an execute form program, intermediate code program, or source program) of the control program of each of the base station 101 and the user device 102, which is software for implementing the aforementioned functions, is provided to the base station 101 and the user device 102, and (ii) a computer (or a CPU or a MPU (Microprocessor Unit)) of each of the base station 101 and the user device 102 reads out the program code stored in the storage medium so as to execute the program.

Examples of the storage medium encompass: tapes, such as magnetic tapes and cassette tapes; disks including magnetic disks, such as floppy disks (registered trademark) and hard disks, and optical disks, such as CD-ROMs (Compact Disc Read-Only Memories), MOs (Magnetic Optical Disks), MDs (mini disks), DVDs (digital video disks), and CD-Rs (CD Recordable); cards, such as IC cards (including memory cards) and optical cards; and semiconductor memories, such as mask ROMs, EPROMs (Erasable Programmable Read-Only Memory), EEPROMs (Electrically Erasable and Programmable Read-Only Memory), and flash ROMs.

Further, each of the base station 101 and the user device 102 can be made connectable to a communication network, and the program code can be supplied via the communication network. The communication networks are not limited to specific means. Examples of the communication network encompass the Internet, an intranet, an extranet, a LAN (Local Area Network), an ISDN (Integrated Services Digital Network), a VAN (Value-Added Network), a CATV (Community Antenna Television) communication network, a virtual private network, a telephone line network, a mobile communication network, a satellite communication network, and the like. Furthermore, a transmission medium constituting the communication network is not particularly limited. Specifically, it is possible to use a wired line such as a line in compliance with an IEEE (Institute of Electrical and Electronic Engineers) 1394 standard, a USB line, a power line, a cable TV line, a telephone line, an ADSL (Asynchronous Digital Subscriber Loop) line, and the like, as the transmission medium. Moreover, it is possible to use (i) a wireless line utilizing an infrared ray used in IrDA (Infrared Data Association) and a remote controller, (ii) a wireless line which is in compliance with a Bluetooth standard (registered trademark) or an IEEE802.11 wireless standard, and (iii) a wireless line utilizing an HDR (High Data Rate), a mobile phone network, a satellite line, a terrestrial digital network, and the like, as the transmission medium. Note that, the present invention can be realized by a computer data signal which is realized by electronic transmission of the program code and which is embedded in a carrier wave.

Further, the present invention can be arranged as described below.

The object of the present invention is to provide a method for feeding back the uplink control signaling information, described below. That is, the base station allocates a required resource to the uplink control channel. Then, the base station carries out allocation of the sequence(s) on the basis of the number of the downlink basic bandwidths allocated to the user device so that the uplink control signaling information in the downlink basic bandwidth(s) allocated to the user device is fed back to the base station. Each of the sequence(s) is mapped on a corresponding piece(s) of the uplink resource. The user device carries out detection of each of the downlink basic bandwidth(s) allocated to the user device and feeds back the target information in each of the downlink basic bandwidth(s) to the base station on the basis of the sequence allocated to each of the downlink basic bandwidth(s). According to the technical method described above, it becomes possible to feed back the uplink control signaling information easily and highly efficiently while using the conventional feedback mechanism. Further, the method is suitably applicable to such a case that the uplink system bandwidth and the downlink system bandwidth do not coincide with each other, which case is considered as occurring with the next generation wireless communication system.

In order to attain the object, according to one aspect of the present invention, a method of the present invention, for feeding back uplink control signaling information, includes: a first step in which a base station divides a downlink system bandwidth into a plurality of downlink basic bandwidths, and informing, via broadcasting of a system, information on such a plurality of downlink basic bandwidths to a plurality of user devices in a cell of the base station; a second step in which the base station allocates, to each of a plurality of uplink basic bandwidths, resource blocks (RB) for a physical uplink control channel (PUCCH); a third step in which the base station carries out allocation of sequences on the basis of the number of downlink basic bandwidths allocated to each of the plurality of user devices, so that each of the plurality of user devices feeds back, to the base station, uplink control signaling information in each of the downlink basic bandwidth(s) allocated to such a user device; a fourth step in which each of the plurality of user devices (i) carries out detection of each of the downlink basic bandwidth(s) allocated to such a user device, (ii) obtains, for each of the downlink basic bandwidths allocated to such a user device, the uplink control signaling information to be fed back, and (iii) feeds back the uplink control signaling information to the base station by use of a corresponding piece of an uplink resource; and a fifth step in which the base station obtains feedback information (i.e. the uplink control signaling information) in each of the downlink basic bandwidth(s) allocated to each of the plurality of user devices, on the basis of the known sequences, and optimizes downlink resource scheduling and a transmitter on the basis of the feedback information thus obtained, the uplink control signaling information including channel quality indicator (CQI), a response (ACK/NACK) to a hybrid automatic repeat request (HARQ), and a scheduling request (SR).

In order to attain the object, according to a second aspect of the present invention, a base station of the present invention includes: a sending/receiving section for sending/receiving control signaling and user data to/from a user device in a cell of the base station; a resource allocation section for dividing a downlink system bandwidth into a plurality of downlink basic bandwidths, and carrying out allocation of pieces of resource of an uplink control channel; a sequence allocation section for allocating sequences to a downlink basic bandwidth(s) allocated to the user device, on the basis of the number of the downlink basic bandwidths allocated to the user device, so that the uplink control signaling information in each of the downlink basic bandwidth(s) allocated to the user device is fed back to the base station; and a resource scheduling and transmitter optimizing section for obtaining feedback information (i.e. the uplink control signaling information) corresponding to each of the downlink basic bandwidth(s) allocated to the user device on the basis of the known sequences, and optimizing downlink resource scheduling and a transmitter.

In order to attain the object, according to a third aspect of the present invention, a user device of the present invention includes: a sending/receiving section for sending/receiving control signaling and user data to/from a base station; a feedback information generation section for detecting each of a downlink basic bandwidth(s) allocated to the user device, and obtaining, for each of the downlink basic bandwidth(s) allocated to the user device, uplink control signaling information to be fed back; and an information feedback section for (i) determining a format of a corresponding uplink control channel on the basis of content of the target information in each of the downlink basic bandwidth(s) allocated to the user device, and (ii) mapping the uplink control signaling information on a corresponding piece of an uplink resource on the basis of a sequence(s) allocated to the downlink basic bandwidth(s) allocated to the user device, so as to feed back the uplink control signaling information to the base station.

Further, the present invention provides a communication system including the foregoing base station and the foregoing user device.

INDUSTRIAL APPLICABILITY

A base station of the present invention can be easily fed back with uplink control signaling information even in a case where an uplink system bandwidth and a downlink system bandwidth do not coincide with each other. Therefore, the base station of the present invention is suitably applicable to an LTE-Advanced system such as Beyond the 3rd Generation (B3G) Mobile Communication System or a digital television broadcasting.

REFERENCE SIGNS LIST

100: Communication system
101: Base station
102: User device
105: Wireless cell (cell)
1010: Sending/receiving section (sending/receiving means)
1011: Resource allocation section (resource allocation means)
1012: Sequence allocation section (sequence allocation means)
1013: Resource scheduling transmission optimizing section (resource scheduling transmission optimizing means)
1020: Sending/receiving section (sending/receiving means)
1021: Feedback information generation section (feedback information generation means)
1022: Information feedback section (information feedback means)

The invention claimed is:

1. A mobile communication system comprising:
a base station apparatus; and a mobile station apparatus, wherein
the base station apparatus and the mobile station apparatus are configured to communicate with each other on a plurality of downlink component carriers and a plurality of uplink component carriers,
the base apparatus configured to transmit, to the mobile station apparatus, downlink data on the plurality of downlink component carriers,
the mobile station apparatus configured to transmit, to the base station apparatus, uplink data on the plurality of uplink component carriers, wherein
the mobile station apparatus configured to transmit, to the base station apparatus, a scheduling request using a physical uplink control channel only on a specific uplink component carrier, the specific uplink component carrier being one of the plurality of uplink component carriers, the specific uplink component carrier being determined in advance between the mobile station apparatus and base station apparatus,
the mobile station apparatus configured to periodically transmit, to the base station apparatus, a channel quality indicator using a physical uplink control channel, the channel quality indicator being transmitted using the physical uplink control channel on the same uplink component carrier as the specific uplink component carrier, wherein
the scheduling request is used for requesting uplink resources resource for transmitting the uplink data, and
a mode for transmission of the channel quality indicator is configured, by the base station apparatus, for each of the plurality of downlink component carriers.

2. A mobile station apparatus that is configured to communicate with a base station apparatus on a plurality of downlink component carriers and a plurality of uplink component carriers, the mobile station apparatus comprising:
a receiving unit configured to receive, from the base station apparatus, downlink data on the plurality of downlink component carriers, and
a transmitting unit configured to transmit, to the base station apparatus, uplink data on the plurality of uplink component carriers , wherein
the transmitting unit configured to transmit, to the base station apparatus, a scheduling request using a physical uplink control channel only on a specific uplink component carrier, the specific uplink component carrier being one of the plurality of uplink component carriers, the specific uplink component carrier being determined in advance between the mobile station apparatus and the base station apparatus,
the transmitting unit configured to periodically transmit, to the base station apparatus, a channel quality indicator using a physical uplink control channel, the channel quality indicator being transmitted using the physical uplink control channel on the same uplink component carrier as the specific uplink component carrier, the scheduling request is used for requesting uplink resources for transmitting the uplink data, and a mode for transmission of the channel quality indicator is configured, by the base station apparatus, for each of the plurality of downlink component carriers.

3. A base station apparatus that is configured to communicate with a mobile station apparatus on a plurality of downlink component carriers and a plurality of uplink component carriers, the base station apparatus comprising:

a transmitting unit configured to transmit, to the mobile station apparatus, downlink data on the plurality of downlink component carriers, and a receiving unit configured to receive, from the mobile station apparatus, an uplink data on the plurality of uplink component carriers , wherein the receiving unit configured to receive, from the mobile station apparatus, a scheduling request using a physical uplink control channel only on a specific uplink component carrier, the specific uplink component carrier being one of the plurality of uplink component carriers, the specific uplink component carrier being determined in advance between the mobile station apparatus and the base station apparatus, the receiving unit configured to periodically receive, from the mobile station apparatus, a channel quality indicator using a physical uplink control channel, the channel quality indicator being transmitted using the physical uplink control channel on the same uplink component carrier as the specific uplink component carrier, the scheduling request is used for requesting uplink resources for receiving the uplink data, and a mode for reception of the channel quality indicator is configured, by the base station apparatus, for each of the plurality of downlink component carriers.

4. A communication method used in a mobile station apparatus that is configured to communicate with a base station apparatus on a plurality of downlink component carriers and a plurality of uplink component carriers, the communication method comprising:

receiving, from the base station apparatus, downlink data on the plurality of downlink component carriers, transmitting uplink data to the base station apparatus on the plurality of uplink component carriers, and transmitting a scheduling request using a physical uplink control channel only a specific uplink component carrier, the specific uplink component carrier being one of the plurality of uplink component carriers, the specific uplink component carrier being determined in advance between the mobile station apparatus and the base station apparatus, periodically transmitting, to the base station apparatus, a channel quality indicator using a physical uplink control channel, the channel quality indicator being transmitted using the physical link control channel on the same uplink component carrier as the specific uplink component carrier, the scheduling request is used for requesting uplink resources for transmitting the uplink data, and a mode for transmission of the channel quality indicator is configured, by the base station apparatus, for each of the plurality of downlink component carriers.

5. A communication method used in a base station apparatus that is configured to communicate with a mobile station apparatus on a plurality of downlink component carriers and a plurality of uplink component carriers, the communication method comprising:

transmitting, to the mobile station apparatus, downlink data on the plurality of downlink component carriers, receiving uplink data from the mobile station apparatus on the plurality of uplink component carriers, and receiving a scheduling request using a physical uplink control channel only a specific uplink component carrier, the specific uplink component carrier being one of the plurality of uplink component carriers, the specific uplink component carrier being determined in advance between the mobile station apparatus and the base station apparatus, periodically receiving, from the mobile station apparatus, a channel quality indicator using a physical uplink control channel, the channel quality indicator being transmitted using the physical uplink control channel on the same uplink component carrier as the specific uplink component carrier, the scheduling request is used for requesting uplink resources for receiving the uplink data, and a mode for reception of the channel quality indicator is configured, by the base station apparatus, for each of the plurality of downlink component carriers.

* * * * *